United States Patent [19]

Komatsuzaki et al.

[11] 4,313,840
[45] Feb. 2, 1982

[54] HEAT TRANSFER OIL AND METHOD FOR DRIVING A FREON TURBINE

[75] Inventors: Shigeki Komatsuzaki, Mito; Moriichi Sato, Hitachi, both of Japan

[73] Assignee: Agency of Industrial Science and Technology, Tokyo, Japan

[21] Appl. No.: 128,168

[22] Filed: Mar. 7, 1980

[30] Foreign Application Priority Data

Mar. 7, 1979 [JP] Japan ................................ 54-25500

[51] Int. Cl.³ .......................... C09K 5/04; C10M 3/20; C10M 3/38
[52] U.S. Cl. ..................................... 252/78.5; 252/77; 252/389 A; 252/390; 252/49.9; 252/51.5 R
[58] Field of Search .................... 252/68, 69, 77, 78.5, 252/51.5 R, 56 S, 389 A, 392, 390, 49.9

[56] References Cited

U.S. PATENT DOCUMENTS

| | | | |
|---|---|---|---|
| 3,630,915 | 12/1971 | Sullivan | 252/78 |
| 3,640,873 | 2/1972 | Avery et al. | 252/78 |
| 3,790,481 | 2/1974 | Byford et al. | 252/49.9 |
| 3,914,179 | 10/1975 | Byford et al. | 252/32.5 |
| 3,926,823 | 12/1975 | Durr et al. | 252/49.9 |

FOREIGN PATENT DOCUMENTS

| | | | |
|---|---|---|---|
| 522450 | 3/1956 | Canada | 252/78.5 |
| 823295 | 11/1959 | United Kingdom | 252/78.8 |

Primary Examiner—P. E. Willis, Jr.

Attorney, Agent, or Firm—Birch, Stewart, Kolasch & Birch

[57] ABSTRACT

Freon stable heat transfer oil comprising polyol ester containing tris-(alkylphenyl) phosphite and benzotriazole

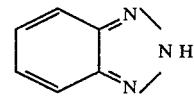

or benzotriazole derivative

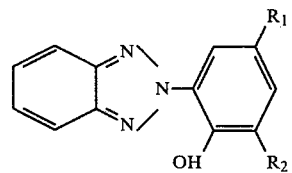

in which $R_1$ and $R_2$ each represents a hydrogen atom or an alkyl group. It is desirable to add tris-(alkylphenyl) phosphite or tris-(phenyl) phosphite in an amount in the range between 0.02–5% by weight and to add benzotriazole or its derivative in an amount in the range between 0.02–1% by weight to the heat transfer oil.

6 Claims, 1 Drawing Figure

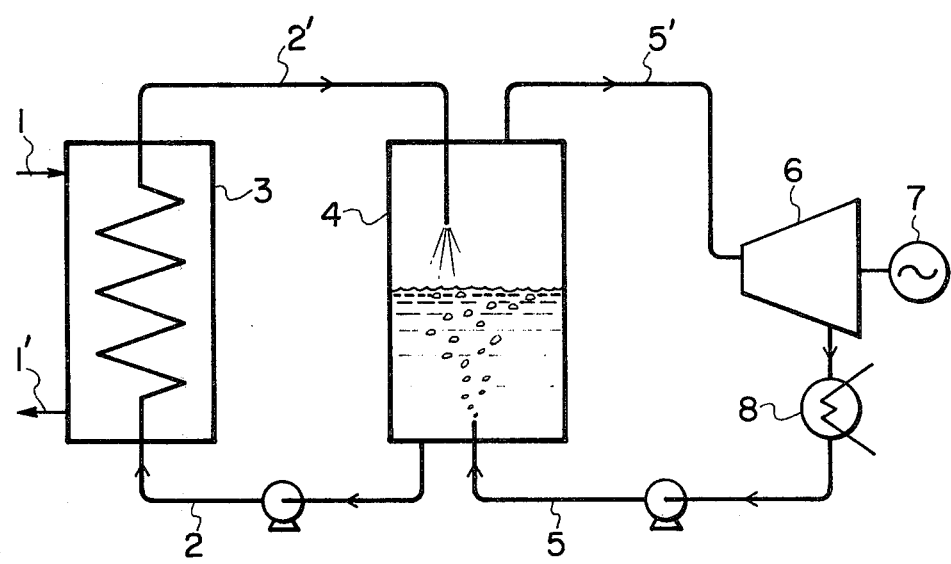

HEAT TRANSFER OIL AND METHOD FOR DRIVING A FREON TURBINE

BACKGROUND OF THE INVENTION

This invention relates to heat transfer oil, and more specifically relates to heat transfer oil which is stable in Freon.

Nowadays, as one of the processes for sparing resources, there is a tendency to possitively utilize exhaust heat and subterranean heat. One of the examples is generation of electric power by Freon turbine (re: Japanese Pat. No. 94806/1976). In such a case, the heat is absorbed in a heat transfer oil and said oil is made to contact directly Freon for producing Freon steam for rotating a turbine, thus providing merit of very high efficiency enabling the apparatus to be minimized remarkably. However, during such process, said oil contacts with Freon at high temperature resulting in the production of HCl. This HCl causes corrosion of the metal of the apparatus and also deteriorates the property of the insulating material in the apparatus. Therefore, it was necessary to apply an indirect heat exchange system through metal wall etc. instead of a more effective direct heat exchange system.

SUMMARY OF THE INVENTION

It is an object of the present invention to provide an excellent Freon stable heat transfer oil of polyol ester which is jointly added with tri-(phenyl)phosphite and another additive of different type.

The present inventors have investigated the Freon stability of polyol ester by adding thereto various kinds of additives. Consequently, the present inventors have succeeded in obtaining excellent Freon stable heat transfer oil by means of using specific ester and adding jointly two kinds of additives thereto. The heat transfer oil of the present invention comprises a polyol ester containing tris-(alkylphenyl)phosphite or tris-(phenyl)phosphite, and benzotriazole having formula,

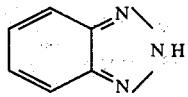

or a benzotriazole derivative having formula,

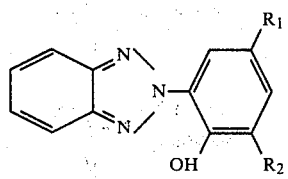

in which $R_1$ and $R_2$ each represents a hydrogen atom or an alkyl group.

Polyol esters useful for the present invention are esters of polyhydric alcohol such as neopentyl glycol, trimethylolethane, trimethylolpropane, pentaerythritol, and saturated monocarboxylic acid having 7–16 carbons in a molecule.

The number of C in the alkyl group in this tris-(phenyl)phosphite is not limited specifically for improving the Freon stability of the polyol ester oil. Nevertheless, when said number of C is too large the solubility to the polyol ester decreases and it is preferable that the number of C does not exceed 20. The amount of said phosphite to be added is preferably in the range between 0.02–5% by weight.

On the other hand, any of the benzotriazole derivative can be used irrespective of the number of C atoms in the alkyl group provided that it is soluble in the polyol ester. The preferable amount of the benzotriazole or its derivative to be added is in the range between 0.02–1% by weight. When the added amount is less than 0.02% by weight, the improvement of Freon stability becomes lower and when the added amount is larger than 1% by weight, although the Freon stability becomes higher, sometimes the additive precipitates contingently. There is little effect on the improvement of Freon stability when the benzotriazole or benzotriazole derivative is used alone. However, the Freon stability of the polyol ester oil is enhanced strongly when it is used together with the tri-(alkylphenyl)phosphite.

BRIEF DESCRIPTION OF THE DRAWINGS

The sole FIGURE of the drawing is a flow diagram showing the system of electric power generation by Freon turbine using the heat transfer oil in the present invention.

DESCRIPTION OF THE PREFERRED EMBODIMENTS

The following examples illustrate the present invention more definitely comparing with the comparative examples of other heat transfer oil, such as polyol ester oil added with only tris-(alkylphenyl)phosphite or tris-(phenyl)phosphite.

The Freon stability of the sample oil is estimated as follows.

1 ml of Freon 113 ($CCl_2F\text{-}CClF_2$) and 1 ml of the sample oil are taken in a glass tube of 6 mm inside diameter and 3 mm thickness. Then, the tube is sealed under the vacuum of 0.25 mm Hg while it is cooled with dry ice so as to reduce the influence by oxygen. After heating at 200° C. for 1000 h, this glass tube is opened and the HCl produced by the reaction of Freon with the sample oil is determined by means of measurement of the amount of $Cl^-$(mg), thus the Freon stability of the sample oil can be evaluated. Measurement of the amount of $Cl^-$(mg) can be carried out by means of titration with $AgNO_3$ solution in conformity to the measuring method of inorganic chloride prescribed in JIS C 2321 (Japanese Industrial Standard).

Although the Freon 113 (Trademark of E. I. duPont de Nemours) is used in this case, the same tendency can be noticed by using any other Freon.

EXAMPLE I 1 ml of the system of trimethylolpropane.tricaprylate added with 0.5% by weight of tris-(nonylphenyl)phosphite, and 1 ml of the system of trimethylolpropane.tricaprylate added with 0.5% by weight of tris-(nonylphenyl)phosphite and further added with 0.5% by weight of benzotriazole,

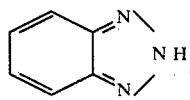

or benzotriazole derivative were respectively taken in a respective glass tube. In each of said glass tube, 1 ml of Freon 113 ($CCl_2F$-$CClF_2$) was taken and then said glass tubes were heated at 200° C. for 1000 h, and each of the amount of the produced chlorine ion in respective glass tube was measured. The results thereof are shown in Table I.

As shown in Table I, it is evident that even the trimethylolpropane.tricaprylate added with only tris-(nonylphenyl)phosphite shows less amount of produced chlorine ion as compared with the trimethylolpropane.-tricaprylate without any additive, and shows some improvement of Freon stability. Nevertheless, it is shown that much more improvement of Freon stability can be achieved when the trimethylolpropane.tricaprylate is added with both of the tris-(nonylphenyl)phosphite and benzotriazole or benzotriazole derivative.

and further added with 0.5% by weight of benzotriazole or benzotriazole derivative, and each of said 1 ml of samples was respectively mixed with 1 ml of Freon 113 in a glass tube. After heating said mixture at 200° C. for 1000 h in the glass tube, each amount of produced chlorine ion was measured. The results thereof are shown in Table II.

It is evident from Table II that the effect of additive in the ester of the pentaerythritol type in this case is the same as in the ester of the trimethylolpropane type.

TABLE 1

| Additive | | Chlorine Ion (mg) |
|---|---|---|
| tris-(nonylphenyl)phosphite | benzotriazole (N—H) | 0.020 |
| | benzotriazole-N-phenyl-OH | 0.020 |
| | benzotriazole-N-(CH3-phenyl)-OH | 0.0081 |
| | benzotriazole-N-(CH3,CH3-phenyl)-OH | 0.0080 |
| | benzotriazole-N-(C4H9-phenyl)-OH | 0.0075 |
| | benzotriazole-N-(C4H9,C4H9-phenyl)-OH | 0.0070 |
| | benzotriazole-N-(C8H17-phenyl)-OH | 0.0072 |
| | benzotriazole-N-(C8H17,C8H17-phenyl)-OH | 0.0073 |
| — | — | 0.080 |
| | | 12 |

TABLE 2

| Additive | | Chlorine Ion (mg) |
|---|---|---|
| tris-(phenyl)phosphite | benzotriazole (N—H) | 0.020 |
| | benzotriazole-N-phenyl-OH | 0.021 |
| | benzotriazole-N-(CH3-phenyl)-OH | 0.0079 |
| | benzotriazole-N-(CH3,CH3-phenyl)-OH | 0.0076 |
| | benzotriazole-N-(C4H9-phenyl)-OH | 0.0080 |
| | benzotriazole-N-(C4H9,C4H9-phenyl)-OH | 0.0072 |
| | benzotriazole-N-(C8H17-phenyl)-OH | 0.0072 |
| | benzotriazole-N-(C8H17,C8H17-phenyl)-OH | 0.0070 |
| — | — | 0.081 |
| | | 13 |

EXAMPLE II 1 ml of samples was taken from each of the systems of pentaerythritol.tetracaprylate added with 0.5% by weight of

EXAMPLE III 1 ml of samples was taken from each of the systems of trimethylolpropane.tricaprylate added with both of

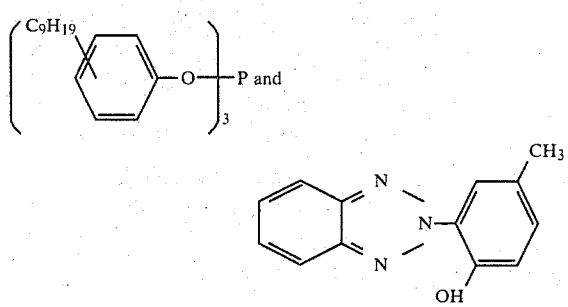

in various ratio, and each of said 1 ml of samples was respectively mixed with 1 ml of the Freon 113 coexisted with a metal piece of SUS 316 (correspond to AISI 316) in respective glass tube. After heating said mixture in the glass tube at 200° C. for 1000 h, each amount of produced chlorine ion was measured. The results thereof are shown in Table III and Table IV. In the above, the dimension of said metal piece was 1×4×40 mm.

TABLE 3

| Added Amount of Each Compound (% by wt.) | | |
|---|---|---|
| $C_9H_{19}$-phenyl phosphite | benzotriazole derivative | Chlorine Ion (mg) |
| 0.5 | 0 | 10 |
| 0 | 0.5 | 30 |
| 0.5 | 0.01 | 11 |
| " | 0.02 | 0.012 |
| " | 0.10 | 0.010 |
| " | 0.50 | 0.015 |
| " | 1.0 | 0.013 |
| " | 2.0 | 0.014 |
| " | 5.0 | 0.013 |

TABLE 4

| Added Amount of Each Compound (% by wt.) | | |
|---|---|---|
| $C_9H_{19}$-phenyl phosphite | benzotriazole derivative | Chlorine Ion (mg) |
| 0.01 | 0.5 | 25 |
| 0.02 | " | 0.072 |
| 0.10 | " | 0.043 |
| 0.20 | " | 0.032 |
| 0.50 | " | 0.015 |
| 1.0 | " | 0.017 |
| 2.0 | " | 0.016 |
| 5.0 | " | 0.020 |

EXAMPLE IV

This example shows a method for heat exchange by using the heat transfer oil in the present invention.

As shown in the FIGURE, the heat in the industrial exhaust heat 1 is transferred into the intermediate heat transfer oil 2 in the present invention through the heat exchanger 3 of indirect contact type. The intermediate heat transfer oil 2', which is heated by the heat transferred, is introduced into the heat exchanger 4 of direct contact type for contacting directly with the liquid Freon 5. The heat in the intermediate heat transfer oil 2' is transferred to liquid Freon 5 and the liquid Freon is vaporized. The vaporized freon is then introduced to the Freon tubine 6 for driving the turbine. Thus the electric generator 7 connected to the turbine is made to rotate for generating electric power.

After transferring the heat to Freon, the intermediate heat transfer oil 2 returns to the heat exchanger 3 of the indirect contact type. On the other hand, the Freon gas exhausted from the turbine 6 is introduced to the condenser 8 and the liquified Freon 5 is made to return to the heat exchanger 4 of the direct contact type.

Thus the industrial exhaust heat can be efficiently utilized by means of above mentioned cycle.

Because of the fact that the heat transfer oil in the present invention has high Freon stability as well as high heat resistance, it is excellently suitable for the intermediate heat transfer oil for such a system of electric power generator by Freon turbine.

What is claimed is:

1. A heat transfer method for driving a Freon turbine comprising the steps of:
   (a) transferring heat of a heat source through a heat exchanger of the indirect contact type to an intermediate heat transfer oil, consisting essentially of:
      (1) a major amount of a polyolester of a reaction product of a polyhydric alcohol selected from the group consisting of neopentylglycol, trimethylolethane, trimethylolpropane and pentaerythritol with a saturated monocarboxylic acid having 7-16 carbon atoms per molecule;
      (2) at least one member selected from the groups consisting of tris-(alkylphenyl)phosphite and tris-(phenyl)phosphite, and
      (3) at least one member selected from the group consisting of benzotriazole and benzotriazole derivatives having the formula

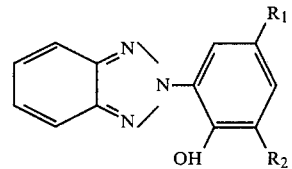

wherein $R_1$ and $R_2$ each represent a hydrogen atom or an alkyl group having 1 to 8 carbon atoms;
whereby said heated intermediate transfer oil gasifies said Freon by contact therewith, said components (2) and (3) being present in an amount sufficient to reduce the generation of chlorine ion; and
   (b) driving said turbine with said gasified Freon.

2. A heat transfer method according to claim 1, wherein tris-(alkylphenyl)phosphite and tris-(phenyl)phosphite are present in an amount of at least 0.02% by weight and wherein benzotriazole or said benzotriazole derivatives are present in an amount of at least 0.02% by weight.

3. A heat transfer method according to claim 2, wherein tris-(alkylphenyl)phosphite and tris-(phenyl)phosphite are present in an amount of 0.02 to 5% by weight.

4. A heat transfer method according to claim 2, wherein benzotriazole or said benzotriazole derivative is present in an amount of 0.02 to 1% by weight.

5. A heat transfer method according to claim 1, wherein said polyolester is trimethylolpropane tricaprylate or pentaerythritol tetracaprylate.

6. A heat transfer method according to claim 1, wherein said turbine rotates an electric generator.

* * * * *